No. 718,366. PATENTED JAN. 13, 1903.
L. A. MAYALL.
MACHINE FOR CUTTING THE CORNERS OF PAPER BOX BLANKS.
APPLICATION FILED OCT. 18, 1902.
NO MODEL. 2 SHEETS—SHEET 1.
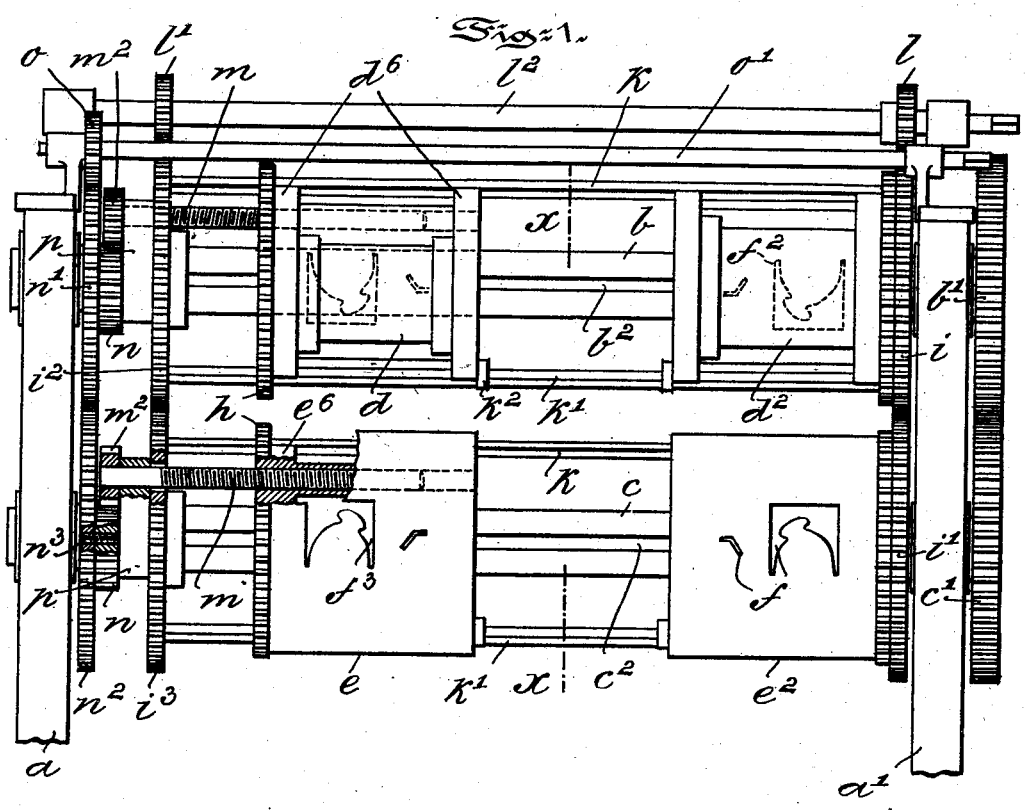
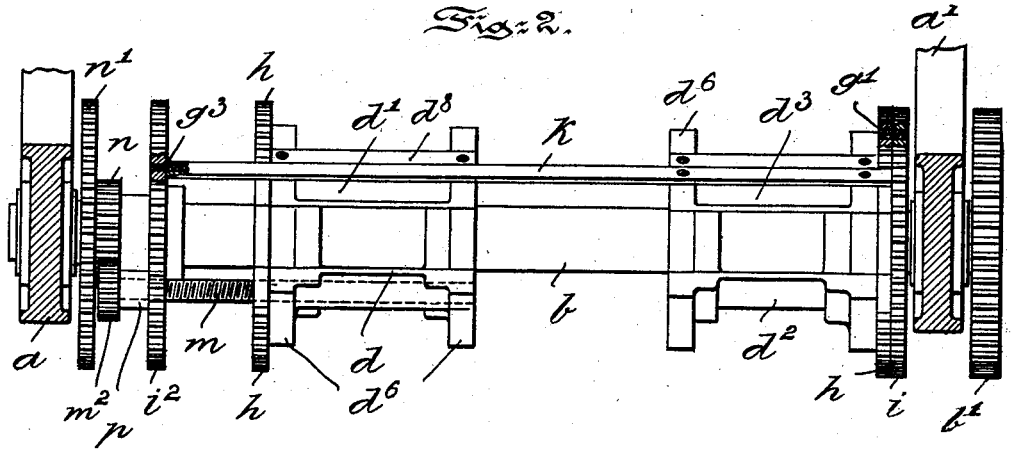

No. 718,366. PATENTED JAN. 13, 1903.
L. A. MAYALL.
MACHINE FOR CUTTING THE CORNERS OF PAPER BOX BLANKS.
APPLICATION FILED OCT. 18, 1902.
NO MODEL. 2 SHEETS—SHEET 2.
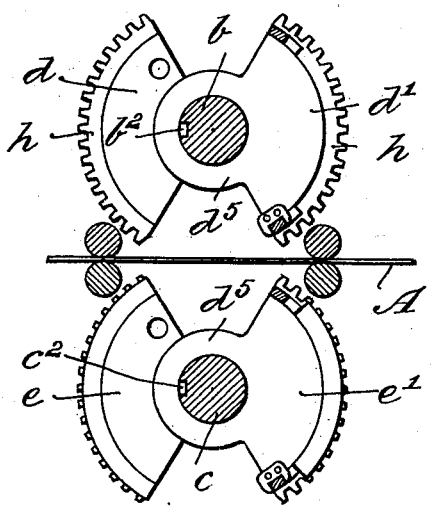
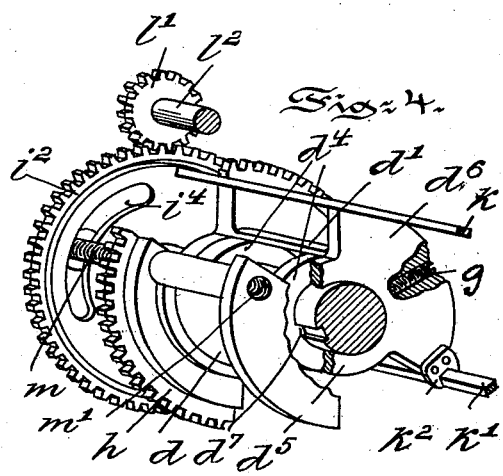
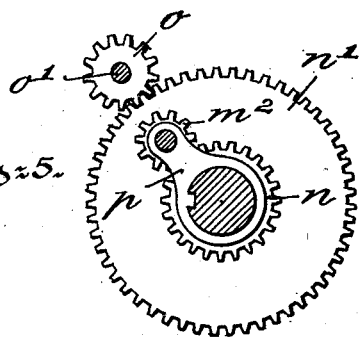
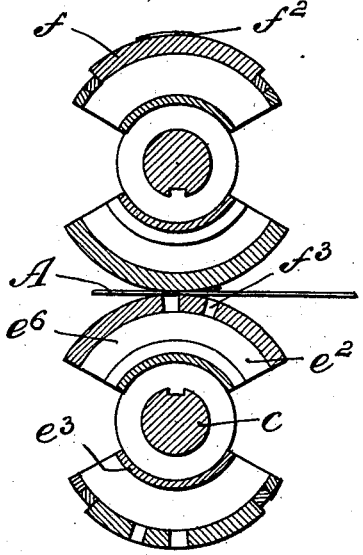
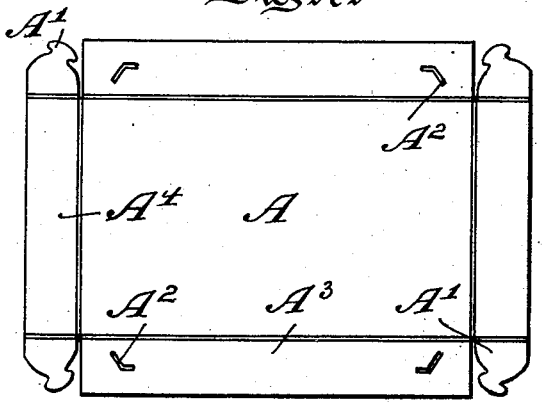

UNITED STATES PATENT OFFICE.

LEWIS A. MAYALL, OF PHILADELPHIA, PENNSYLVANIA.

MACHINE FOR CUTTING THE CORNERS OF PAPER-BOX BLANKS.

SPECIFICATION forming part of Letters Patent No. 718,366, dated January 13, 1903.

Application filed October 18, 1902. Serial No. 127,785. (No model.)

*To all whom it may concern:*

Be it known that I, LEWIS A. MAYALL, a citizen of the United States, residing at the city of Philadelphia, in the county of Philadelphia and State of Pennsylvania, have invented certain new and useful Improvements in Machines for Cutting the Corners of Paper-Box Blanks, of which the following is a specification.

My invention has relation to a machine for cutting the corners of paper-box blanks, and in such connection it relates to the construction and arrangement of such a machine.

The principal objects of my invention are, first, to provide a machine wherein the dies for cutting the corners of paper-box blanks are carried by rotary cutting means between which the paper-box blanks are fed; second, to provide mechanism adapted to shift the rotary cutting means carrying the dies for cutting the corners of paper-box blanks to adjust the dies thereof, and thereby to bring the same toward or away from each other to alter successive cuts in a longitudinal as well as radial direction, and thereby permit cutting of corners of paper-box-blanks of any desired length and width; third, to provide each of the rotary cutting means with segmental gears meshing with each other during the cutting of the corners to insure proper alinement of the male and female dies carried by the rotary cutting means, so as to register with each other, and, fourth, to provide guidebars adapted to guide one set of the rotary cutting means, consisting, preferably, of sectors, during shifting in a longitudinal direction to insure proper alinement of both sets of sectors of the rotary cutting means when adjusted in a radial direction.

My invention, stated in general terms, consists of a machine for cutting corners of paper-box blanks constructed and arranged in substantially the manner hereinafter described and claimed.

The nature and scope of my invention will be more fully understood from the following description, taken in connection with the accompanying drawings, forming part hereof, in which—

Figure 1 is a side elevational view of the upper portion of a machine embodying main features of my invention in which the die-plates of the upper sets of sectors constituting the rotary cutting means of the machine are shown removed therefrom. Fig. 2 is a top or plan view, partly sectioned, of the upper set of sectors constituting the rotary cutting means of the machine. Fig. 3 is a section taken on the line $x$ $x$ of Fig. 1, illustrating in rear elevation two sets of superposed sectors of the rotary cutting means of the machine arranged diametrically opposite each other. Fig. 4 is a perspective view of one set of the sectors with the dies shown removed, illustrating the manner of connecting two sectors with each other and one of them with a shaft and also illustrating means for adjusting one of the sectors in a radial direction and both of the sectors in a longitudinal direction. Fig. 5 is a detail view illustrating, partly in side elevation and partly in section, the mechanism for actuating a threaded spindle for shifting the sectors on their supporting-shaft. Fig. 6 is a sectional view of the sectors and die-plates, illustrating the manner of cutting the corners of paper-box blanks; and Fig. 7 is a top or plan view of a paper-box blank after the corners thereof have been cut by the machine.

Referring to the drawings, $a$ and $a'$ represent the upper portion of the side frames of the machine, in which two shafts $b$ and $c$ have their bearings. Motion is imparted to the shafts $b$ and $c$ by gear-wheels $b'$ and $c'$ from any suitable source of power. (Not shown.) On each of the shafts are arranged two sets of sectors, the sectors $d$ and $d'$ and $d^2$ and $d^3$ being arranged on the shaft $b$ and the sectors $e$ and $e'$ and $e^2$ and $e^3$ being arranged on the shaft $c$ and constituting the rotary cutting means of the machine. Each of the sectors $d$, $d'$, $d^2$, and $d^3$ and $e$, $e'$, $e^2$, and $e^3$ is provided with a collar, by means of which the same is connected with the supporting-shaft $b$ or $c$. The collars $d^4$ of the sectors $d$ and $d^2$ and $e$ and $e^2$ are offset, so as to fit within the collars $d^5$ of the sectors $d'$ and $d^3$ and $e'$ and $e^3$ and to constitute the means of locking a pair of diametrically opposite sectors together, as illustrated in Figs. 2 and 4. To the flanges $d^6$ and $e^6$ of the sectors are secured the dies $f$ and $f'$, one, $f$, forming the male die and the other, $f'$, the female die. The male dies $f$ have a projecting portion $f^2$ of the contour or outline of the corner to be cut and preferably carried by the sectors $d$ and $d'$ and $d^2$ and $d^3$, and the female dies $f'$ having a cut-out portion $f^3$, corresponding in outline with the projection $f^2$, carried by the sectors $e$ and $e'$ and $e^2$ and $e^3$ on the shaft $c$. In order that the dies $f$ and $f'$ may register with each other during the cutting operation when the paper-box blank A is fed between the same, as illustrated in Fig. 6, each of the sectors $d$, $d'$, $d^2$, and $d^3$ and $e$, $e'$, $e^2$, and $e^3$ is provided with segmental gear $h$, suitably secured thereto. During the rotation of the sectors the gears $h$ will mesh with each other and will in such manner at all times insure the registering of the parts $f^2$ and $f^3$ of the dies $f$ and $f'$. The shafts $b$ and $c$ are provided with keyways or grooves $b^2$ and $c^2$, into which fit the projections $d^7$ of the offset collars $d^4$ of the sectors $d$ and $d^2$ and $e$ and $e^2$, slidably locking, respectively, these sectors to their shafts. The collars $d^5$ of the sectors $d'$ and $d^3$ and $e'$ and $e^3$ are loosely mounted on the shafts $b$ and $c$, so that the sectors may be readily turned thereon. It is, however, preferable to clamp these loose sectors to their respective shafts after the same have been radially adjusted to permit the cutting of the corners of paper-box blanks of varying lengths. The clamping of these loose sectors is accomplished by the set-screws $g$ passing through one of the flanges $d^6$ thereof, as illustrated in Fig. 4. In order to insure the radial alinement of the loose sectors $d'$ and $d^3$ and $e'$ and $e^3$ on both shafts $b$ and $c$, two of the loose sectors $d^3$ and $e^3$, by means of the bolts $g'$, are secured to the gear-wheels $i$ and $i'$, loosely mounted on the shafts $b$ and $c$ and meshing with each other, as illustrated in Figs. 1 and 2. The gear-wheels $i$ and $i'$, by means of the rods $k$ and $k'$, are connected with the gear-wheels $i^2$ and $i^3$, loosely mounted on the shafts $b$ and $c$, and these rods $k$ and $k'$ form the means of transmitting the rotary movement of the gear-wheels $i$ and $i'$ and the loose sectors $d^3$ and $e^3$ to the gear-wheels $i^2$ and $i^3$ and the loose sectors $d'$ and $e'$ on the other end of the shafts $b$ and $c$. As shown in Figs. 1 and 2, the rods $k$ and $k'$, by means of the bolts $g^3$, are preferably secured to the gear-wheels $i$ and $i^2$ and $i'$ and $i^3$, as well as to one of the loose sectors $d^3$ and $e^3$ on the shafts $b$ and $c$, and loosely engage the sectors $d'$ and $e'$, as shown in Fig. 2, for a purpose to be hereinafter fully explained. The radial adjustment of the loose sectors $d'$ and $d^3$ and $e'$ and $e^3$ toward the fixed sectors $d$ and $d^2$ and $e$ and $e^2$ and their respective die-plates $f$ and $f'$ is accomplished by means of pinions $l$ and $l'$, engaging the gear-wheels $i$ and $i^2$. These pinions $l$ and $l'$ are secured to a shaft $l^2$, which by being turned imparts its rotary movement to the pinions $l$ and $l'$ and in turn operates the gear-wheels $i$ and $i'$ and $i^2$ and $i^3$, and these gear-wheels by the intervention of the rods $k$ and $k'$ will turn the loose sectors $d'$ and $d^3$ and $e'$ and $e^3$ on the shafts $b$ and $c$. It will thus be observed that the loose sectors may be readily turned in unison on the shafts $b$ and $c$, and the die-plates $f$ and $f'$ of the diametrically opposite loose sectors will always register with each other, while the die-plates $f$ and $f'$ of the fixed sectors $d$ and $d^2$ and $e$ and $e^2$ will be controlled by the grooves $b^2$ and $c^2$ of the shafts $b$ and $c$ with the gear-wheels $b'$ and $c'$. In order to permit the cutting of corners of paper-box blanks of varying widths, one set of diametrically opposite sectors $d$ and $d'$ and $e$ and $e'$ may be shifted in a longitudinal direction on the shafts $b$ and $c$. The shifting of the upper set of sectors $d$ and $d'$, for instance, is accomplished by a threaded spindle $m$, engaging a complemental threaded portion or opening $m'$ in the fixed sector $d$. The threaded spindle $m$ passes through an opening $i^4$, arranged in the gear-wheel $i^2$ to permit a radial adjustment of the loose sector $d'$ of the set of sectors, as illustrated in Fig. 4. By the turning of the spindle $m$ by means of a pinion $m^2$, secured thereto, the fixed sector $d$ and loose sector $d'$ will be shifted on the shaft $b$ toward or away from the sectors $d^2$ and $d^3$. The loose sector $d'$ being interlocked with the fixed sector $d$, as hereinbefore described, slides during the shifting between the rods $k$ and $k'$, which guides the same, and so insures the proper alinement of this sector to the other loose sector $d^3$ of the shaft $b$. The loose sector $d'$ is provided, preferably, with rods $d^8$, connected with the flanges $d^6$ thereof, which contact with the guide-rods $k$ and $k'$ and afford a bearing for the same on the sector. As illustrated in Fig. 4, one of the guide-rods $k'$ passes through a guide-piece $k^2$, secured to the loose sector $d'$, which clamps said rod $k'$ to the sector $d'$, but permits at the same time a movement in a longitudinal direction. It is necessary, however, that both sets of diametrically opposite sectors $d$ and $d'$ and $e$ and $e'$ be shifted on the shafts $b$ and $c$ in unison to insure the registering of their respective die-plates $f$ and $f'$ after each longitudinal adjustment thereof. For this purpose the pinion $m^2$ of the threaded spindle $m$ of the fixed sector $d$ receives its rotary movement from a pinion $n$, which by means of a bolt $n^3$ is connected with a gear-wheel $n'$, loosely mounted on the shaft $b$. This gear-wheel is rotated by means of a pinion $o$ meshing therewith and receiving its motion from a shaft $o'$, preferably manually turned by a crank-arm. (Not shown.) The gear-wheel $n'$ meshes with a gear-wheel $n^2$, loosely mounted on the shaft $c$, to which is secured by the bolt $n^3$ the pinion $n$, meshing with the pinion $m^2$ of the threaded spindle $m$, engaging the fixed sector $e$ of the lower set of sectors $e$ and $e'$. The thread of the spindle $m$ in this instance is, however, oppositely arranged to the thread of the spindle $m$ of the upper set of sectors $d$ and $d'$. It will therefore be observed that when the pinion $o$ is rotated the rotary movement of the same by the gear-wheels $n'$ and $n^2$ and pinions $n$ and $m^2$ will be transmitted to the threaded spindles $m$, which according to the direction of rotation will shift both sets of diametrically opposite sectors $d$ and $d'$ and $e$ and $e'$ in alinement toward or away from the sectors $d^2$ and $d^3$ and $e^2$ and $e^3$. As illustrated in Figs. 1 and 5, each of the spindles $m$ is connected with the shaft $b$ or $c$ by a bracket $p$, which by engaging the keyway or groove thereof is securely connected with the shaft $b$ or $c$.

During the cutting of the corners $A'$ of the paper-box blank $A$, as illustrated in Fig. 6, angular slots $A^2$ are simultaneously cut in the side flaps $A^3$ by the dies $f$ and $f'$, which angular slots $A^2$, as is well known, permit the connecting of the flaps $A^4$ of the paper-box blank $A$ with the flaps $A^3$ by the corners $A'$ thereof, as illustrated in Fig. 7.

Having thus described the nature and objects of my invention, what I claim as new, and desire to secure by Letters Patent, is—

1. In a machine of the character described, a shaft and actuating means therefor, in combination with rotary cutting means, consisting of two sectors normally arranged diametrically opposite each other, means for sliding both sectors longitudinally on the shaft, and means for turning one sector independently of the other to adjust the radial position of said sectors.

2. In a machine of the character described, a shaft and actuating means therefor, in combination with rotary cutting means consisting of two sets of sectors, each set normally arranged diametrically opposite each other on said shaft, means for shifting one set of sectors toward and away from the other set, and means for radially adjusting one of said sets of sectors toward the other.

3. In a machine of the character described, two shafts and means for driving the same, in combination with rotary cutting means, consisting of two sets of sectors, each set normally arranged diametrically opposite the other set on each of said shafts, means for simultaneously shifting each set of diametrically opposite sectors toward and away from the other set, and means for radially and simultaneously turning one of each of the two sets of sectors toward the other sets of sectors.

4. In a machine of the character described, a shaft and means for actuating the same, in combination with rotary cutting means consisting of two sets of sectors, each set normally arranged diametrically opposite the other set on said shaft, means for shifting one set of sectors toward and away from the other set of sectors, means for radially turning one of each set of sectors toward the other, and means adapted to connect the radially-adjustable sectors to guide and hold the same in alinement with each other during longitudinal adjustment of one set of sectors and during radial adjustment of the adjustable sectors of both sets.

5. In a machine of the character described, two shafts and means for actuating the same, in combination with two sets of sectors on each of said shafts, each set normally arranged diametrically opposite each other and each sector thereof adapted to carry a male or female die, means for simultaneously shifting one set of superposed sectors toward and away from the other set, means for radially and simultaneously turning one set of each of the two sets of superposed sectors toward the other set, and means connected with each of the sectors adapted to insure the registering of said dies.

In testimony whereof I have hereunto set my signature in the presence of two subscribing witnesses.

LEWIS A. MAYALL.

Witnesses:
J. WALTER DOUGLASS,
THOMAS M. SMITH.